(12) United States Patent
Bishop

(10) Patent No.: US 11,573,147 B2
(45) Date of Patent: Feb. 7, 2023

(54) TEMPERATURE COMPENSATED DIFFERENTIAL PRESSURE SYSTEM

(71) Applicant: Allen Bishop, Houston, TX (US)

(72) Inventor: Allen Bishop, Houston, TX (US)

( * ) Notice: Subject to any disclaimer, the term of this patent is extended or adjusted under 35 U.S.C. 154(b) by 37 days.

(21) Appl. No.: 17/361,971

(22) Filed: Jun. 29, 2021

(65) Prior Publication Data

US 2021/0404900 A1    Dec. 30, 2021

Related U.S. Application Data

(60) Provisional application No. 63/046,146, filed on Jun. 30, 2020.

(51) Int. Cl.
  *G01L 19/04* (2006.01)
  *G01L 19/14* (2006.01)
  *G01L 13/00* (2006.01)

(52) U.S. Cl.
  CPC .............. *G01L 19/04* (2013.01); *G01L 13/00* (2013.01); *G01L 19/14* (2013.01)

(58) Field of Classification Search
  None
  See application file for complete search history.

(56) References Cited

U.S. PATENT DOCUMENTS

| | | | |
|---|---|---|---|
| 4,598,381 A | 7/1986 | Cucci | |
| 4,722,728 A | 2/1988 | Awa et al. | |
| 4,841,776 A * | 6/1989 | Kawachi | G01L 19/0046 73/717 |
| 5,307,683 A | 5/1994 | Phelps et al. | |
| 5,811,690 A | 9/1998 | Hershey | |
| 6,688,182 B2 * | 2/2004 | Kurtz | G01F 1/46 73/727 |
| 7,441,461 B2 | 10/2008 | Muth et al. | |
| 10,466,127 B2 * | 11/2019 | Sgourakes | G01L 19/0046 |
| 10,627,302 B2 * | 4/2020 | Strei | G01L 13/026 |
| 10,712,221 B2 * | 7/2020 | Cimberio | G01F 1/42 |
| 2014/0090476 A1 | 4/2014 | Miller et al. | |

* cited by examiner

*Primary Examiner* — Peter J Macchiarolo
*Assistant Examiner* — Jermaine L Jenkins
(74) *Attorney, Agent, or Firm* — Boudwin Intellectual Property; Daniel Boudwin

(57) ABSTRACT

A temperature compensated differential pressure system is provided. The system includes a pair of flanges affixed together each having a flange diaphragm therein, wherein a plurality of capillary tubes extends between the pair of flanges and a pair of opposed remote diaphragm housings. The remote diaphragm housings include a remote diaphragm therein, wherein the remote diaphragm displaces a fill fluid in pressure capillaries to displace each flange diaphragm to detect a differential pressure between each location of the remote diaphragm housings. A compensating capillary extends from the remote diaphragm housings to an opposing flange diaphragm, wherein the compensating capillary is not in operable communication with the remote diaphragms. As such, any fluctuation in fill fluid volume of the compensating capillaries due to temperature fluctuations is applied to an opposing flange diaphragm to cancel temperature effects from the differential pressure determination.

20 Claims, 4 Drawing Sheets

TEMPERATURE COMPENSATED DIFFERENTIAL PRESSURE SYSTEM

CROSS REFERENCE TO RELATED APPLICATIONS

This application claims the benefit of U.S. Provisional Application No. 63/046,146 filed on Jun. 30, 2020. The above identified patent application is herein incorporated by reference in its entirety to provide continuity of disclosure.

BACKGROUND OF THE INVENTION

The present invention relates to remote differential pressure systems. More particularly, the present invention pertains to a remote differential pressure system having temperature compensation to eliminate temperature effects on the differential pressure detected by the system.

Many commercial and industrial processes require differential pressure monitoring to determine the pressure at two distinct points in a process. This is often measured utilizing diaphragm seals in communication with a closed fluid system, such the diaphragm is displaced upon the application of pressure, which then displaces the fluid to actuate a pressure gauge or other pressure sensor. Particularly, in differential pressure monitoring systems, two remote diaphragm seals are placed at distinct points in the process to measure pressures at those points, which are then compared at a joint pressure measurement device. However, as the different points in the process may significantly vary in location and exposure to the elements, the temperature at each remote diaphragm seal may differ significantly. As the fill fluid in the closed pressure system is similarly exposed to such differences in pressure, the fill fluid will expand or contract, thereby affecting the measured pressure the pressure sensor.

For example, a diaphragm seal at a high-pressure side of a process may be submerged within a vessel, whereas the opposing diaphragm seal at the how-pressure side of the process may be located outdoors exterior to the tank. On a hot day, the fill fluid on the low-pressure side may expand significantly, while the fill fluid on the high-pressure side may be comparably unaffected by the ambient temperature change. As a result, the reported differential pressure includes internal system pressure changes due to temperature fluctuation and is therefore inaccurate. As the expansion of the fill fluid on a single side of the differential pressure monitoring system affects the transmission of pressure from the remote diaphragm seal to the pressure sensor, the low-pressure side will report a combination of the desired local pressure measurement and the temperature effects on the internal pressure of the fill fluid. Therefore, a device that can compensate for temperature fluctuations on opposing sides of the pressure sensor in an efficient manner, such that accurate differential pressure readings are provided is desired.

In light of the devices disclosed in the known art, it is submitted that the present invention substantially diverges in design elements from the known art and consequently it is clear that there is a need in the art for an improvement to existing remote differential pressure systems. In this regard, the instant invention substantially fulfills these needs.

SUMMARY OF THE INVENTION

In view of the foregoing disadvantages inherent in the known types of remote differential pressure systems now present in the known art, the present invention provides a temperature compensated differential pressure system wherein the same can be utilized for providing convenience for the user when determining an accurate differential pressure between two points irrespective of fluctuations in pressure due to temperature changes.

The present system comprises a first flange affixed to a second flange, wherein the first flange comprises a first flange diaphragm therein and the second flange comprises a second flange diaphragm therein. A plurality of capillary tubes comprises a first pressure capillary tube, a second pressure capillary tube, a first compensating capillary tube, and a second compensating capillary tube. The first pressure capillary tube extends through a first flange inlet and is in operable communication with the first flange diaphragm. The first compensating capillary tube extends through the first flange inlet and is in operable communication with the second flange diaphragm. The second pressure capillary tube extends through a second flange inlet and is in operable communication with the second flange diaphragm. The second compensating capillary tube extends through the second flange inlet and is in operable communication with the first flange diaphragm. Each of the plurality of capillary tubes comprises a fill fluid therein. A first remote diaphragm housing includes a first remote diaphragm therein, wherein an opposing end of the first pressure capillary tube is in operable communication with the first remote diaphragm. A second remote diaphragm housing includes a second remote diaphragm therein, wherein an opposing end of the second pressure capillary tube is in operable communication with the second remote diaphragm. As each of the first and second remote diaphragms is displaced via pressure in a media, the pressure is transmitted to the first and second flange diaphragms via the first and second pressure capillary tubes, respectively.

In some embodiments, a first capillary housing is disposed about the first pressure capillary tube and the first compensating capillary tube, and a second capillary housing is disposed about the second pressure capillary tube and the second compensating capillary tube. In another embodiment, each of the first capillary housing and the second capillary housing comprises an articulated metal enclosure. In other embodiments, a vacuum is maintained within each of the first capillary housing and the second capillary housing. In yet another embodiment, the first pressure capillary tube is maintained parallel to the first compensating capillary tube between the first remote diaphragm housing and the first flange, and the second pressure capillary tube is maintained parallel to the second compensating capillary tube between the second remote diaphragm housing and the second flange. In some embodiments, each of the first flange inlet and the second flange inlet comprises a pair of openings, wherein each opening of the pair of openings receives one of the plurality of capillary tubes therethrough. In another embodiment, the first compensating capillary tube is equal in volume to the second compensating capillary tube. In other embodiments, a remote end of each of the first compensating capillary tube and the second compensating capillary tube is closed. In yet another embodiment, a forward portion of each of the first compensating capillary tube and the second compensating capillary tube is angled to bypass the first flange diaphragm and the second flange diaphragm, respectively. In some embodiments, the first compensating capillary tube and the second compensating capillary tube extend through a gap defined between each of the first flange and the second flange to enter an opposing flange. In another embodiment, the forward portion of each compensating capillary tube traverses through a channel defined through each of the first flange and the second flange. In other embodiments, a gap is defined between the first flange and the second flange, the gap dimensioned to removably receive a differential pressure measurement device therebetween. In yet another embodiment, the first flange is secured to the second flange via a plurality of fasteners, wherein the plurality of fasteners is disposed on opposing lateral sides of each of the first flange and the second flange. In some embodiments, the first compensating capillary tube and the second compensating capillary tube extending between the first flange and the second flange are disposed parallel and adjacent to at least one of the plurality of fasteners. In another embodiment, at least one fill port is disposed within each of the first flange and the second flange, wherein the fill port is in fluid communication with an interior volume of one of the plurality of capillary tubes. In other embodiments, each of the first remote diaphragm housing and the second remote diaphragm housing comprises a media inlet in operable communication with the first remote diaphragm and the second remote diaphragm, respectively. In yet another embodiment, the media inlet extends from a front side of each of the first remote diaphragm housing and the second remote diaphragm housing to the first remote diaphragm and the second remote diaphragm, respectively. In some embodiments, each of the plurality of capillary tubes is welded in place within the first flange inlet and the second flange inlet. In another embodiment, the first flange inlet and the second flange inlet each include a flange shroud extending over a portion of the first capillary housing and the second capillary housing, respectively. In other embodiments, the first remote diaphragm housing and the second remote diaphragm housing comprise a remote shroud extending over a portion of the first capillary housing and the second capillary housing, respectively.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
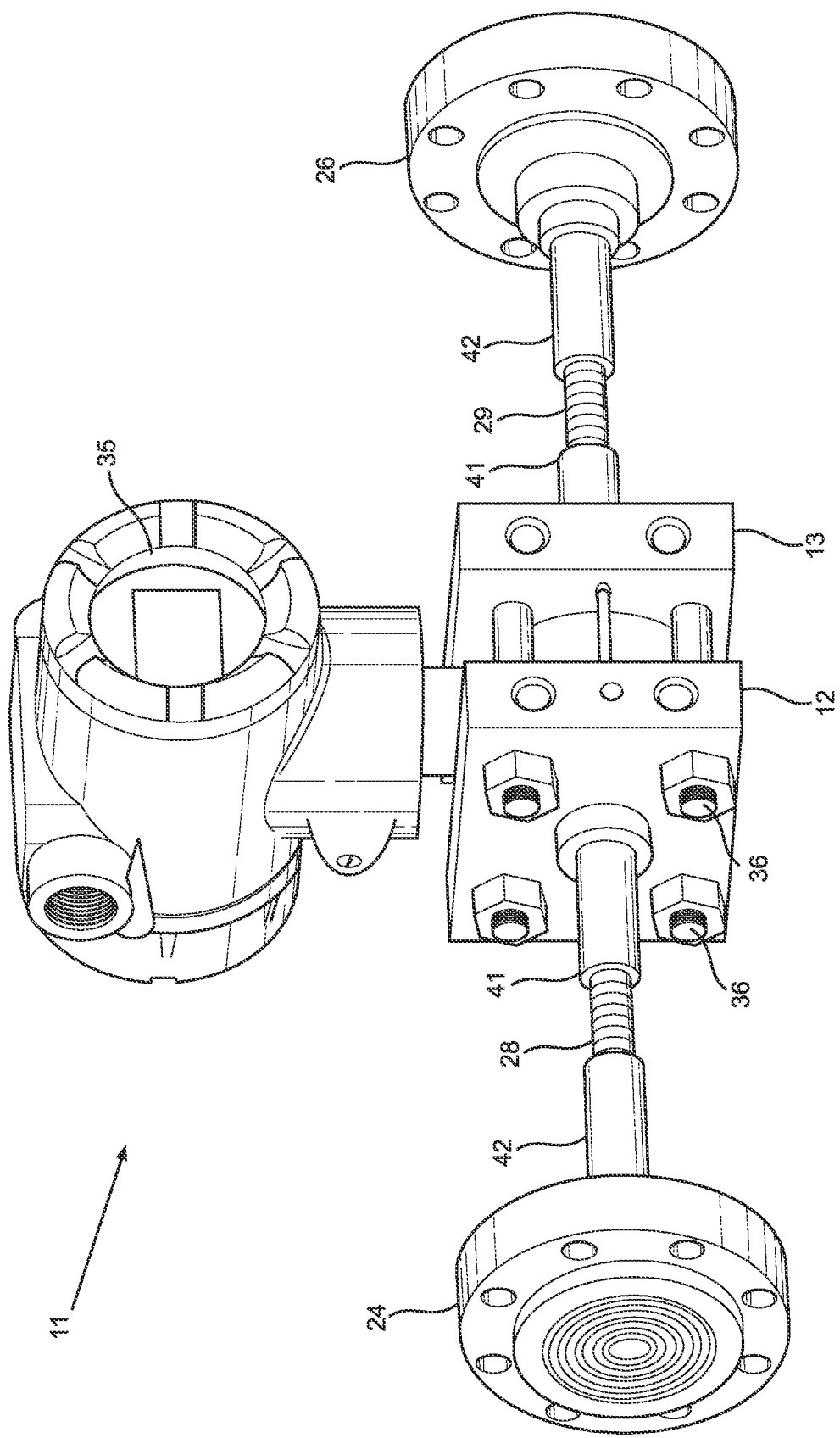
FIG. 1 shows a perspective view of an embodiment of the temperature compensated differential pressure system.

Reference is made herein to the attached drawings. Like reference numerals are used throughout the drawings to depict like or similar elements of the temperature compensated differential pressure system. The figures are intended for representative purposes only and should not be considered to be limiting in any respect.

Referring now to FIG. 1, there is shown a perspective view of an embodiment of the temperature compensated differential pressure system. The temperature compensated differential pressure system 11 comprises a first flange 12 affixed to a second flange 13 via a plurality of fasteners 36. In the shown embodiment, the plurality of fasteners 36 comprise a series of bolts, however, other means of securing the first flange 12 to the second flange 13 are contemplated. The first and second flanges 12, 13 are secured together defining a gap therebetween, such that a differential pressure measurement device 35 can be secured between the first and second flanges 12, 13 within the gap. The differential pressure measurement device 35 can comprise a differential pressure transmitter, gauge, or other measurement device. In the shown embodiment, the differential pressure measurement device 35 includes a display screen for displaying a detected difference in the pressures detected at each of the first and second flanges 12, 13 as further described elsewhere herein.

The temperature compensated differential pressure system 11 further comprises a first remote diaphragm housing 24 operably connected to the first flange 12, and a second remote diaphragm housing 26 operably connected to the second flange 13. In operation, the first and second remote diaphragm housings 24, 26 are placed in remote locations that the user wishes to determine a differential pressure between. For example, the first remote diaphragm housing 24 can be placed within a vessel and the second remote diaphragm housing 26 can be placed exterior to the vessel, such that the detected differential pressure can be utilized to determine the volume of fluid presently within the vessel. The operation of the temperature compensated differential pressure system 11 will be further discussed elsewhere herein.

Figure 2:
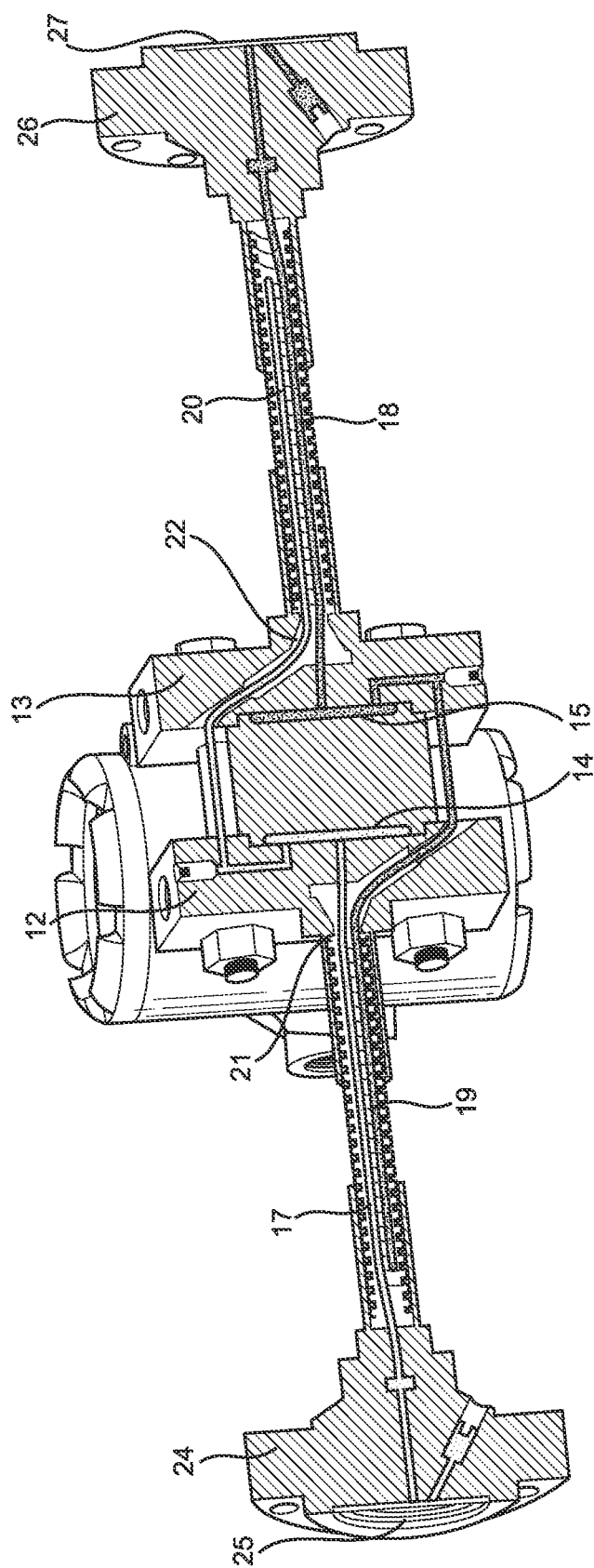
FIG. 2 shows a lower cross-sectional view of an embodiment of the temperature compensated differential pressure system.

The first and second flanges 12, 13 are operably connected to the first and second remote diaphragm housings 24, 26 via a plurality of capillary tubes as further described in relation to FIG. 2 of the present disclosure. In the shown embodiment, the plurality of capillary tubes is encased within a first capillary housing 28 between the first remote diaphragm housing 24 and the first flange 12, and a second capillary housing 29 between the second remote diaphragm housing 26 and the second flange 13, respectively. In this manner, the plurality of capillary tubes is shielded to minimize damage thereto, as well as reducing wear and tear during use. In sonic embodiments, an interior volume of the first and second capillary housings 28, 29 are maintained at a vacuum so as to reduce heat transfer between the surrounding area and the plurality of capillary tubes. The temperature compensated differential pressure system 11 comprises a closed system, wherein the ambient pressure of the surrounding area is sampled at the first and second remote diaphragm housings 24, 26 and transmitted to the first and second flanges 12, 13 via the plurality of capillaries. In the shown embodiment, the connection between the first and second capillary housings 28, 29 and each of the first and second remote diaphragm housings 24, 26 are protected by a rigid remote shroud 41 extending over a portion of each of the first and second capillary housings 28, 29. The remote shroud 41 provides structural integrity to the connection between the first and second capillary housings 28, 29 and the first and second remote diaphragm housings 24, 26. Similarly, in the shown embodiment, a rigid flange shroud 42 extends from the first and second flanges 12, 13 over a portion of the first and second capillary housings 28, 29 to increase the structural integrity of a connection therebetween. In this manner, the remote shrouds 41 and the flange shrouds 42 protect the first and second capillary housings 28, 29 at each end thereof, such that the connections are maintained.

Referring now to FIG. 2, there is shown a lower cross-sectional view of an embodiment of the temperature compensated differential pressure system. The first flange 12 further comprises a first flange diaphragm 14 therein, wherein the first flange diaphragm 14 is in operable communication with a first remote diaphragm 25 disposed within the first remote diaphragm housing 24 via a first pressure capillary tube 17. The first pressure capillary tube 17 extends into the first flange 12 via a first flange inlet 21, wherein the first flange inlet 21 retains file first pressure capillary tube 17 therein. The first pressure capillary tube 17 comprises a fill fluid therein, such that as the first remote diaphragm 25 is displaced by local pressure in the first remote location, the fill fluid is displaced, thereby transferring the pressure detected from the first remote diaphragm 25 to the first flange diaphragm 14, Similarly, the second remote diaphragm housing 26 includes a second remote diaphragm 27 therein, wherein the second remote diaphragm 27 is in operable communication with a second flange diaphragm 15 disposed within the second flange 13 via a second pressure capillary tube 18. The second pressure capillary tube 18 extends into the second flange 13 via a second flange inlet 22, wherein the second flange inlet 22 retains the second pressure capillary tube 18 therein. As the second remote diaphragm 27 is displaced via pressure at the second remote location, the second pressure capillary tube 18 transfers the pressure to the second flange diaphragm 15, such that the first and second flange diaphragms 14, 15 transmit the two detected pressures to the differential pressure measurement device therebetween.

Due to operating conditions, the differential pressure between the first and second remote diaphragm housings 24, 26 may be misreported as additional external effects are applied to the first and second pressure capillary tubes 17, 18, respectively. Particularly, as the temperature between the two remote locations can significantly differ, the first and second pressure capillary tubes 17, 18 report a combination of the detected pressure and any fluctuations of fill fluid pressure caused by temperature differences. As such, the system further comprises an additional compensating capillary tube on each of the high-pressure side and the low-pressure side of the system. A first compensating capillary tube 19 is in operable communication with the second flange diaphragm 15, whereas a second compensating capillary tube 20 is in operable communication with the first flange diaphragm 14. The first and second compensating capillary tubes 19, 20 extend towards the first and second remote diaphragm housings 24, 26, respectively, however each of the first and second compensating capillary tubes 19, 20 are separate from the first and second remote diaphragms 25, 27. As such, the only pressure effects on the fill fluid within the first and second compensating capillary tubes 19, 20 are temperature related. Therefore, as the first and second compensating capillary tubes 19, 20 bypass the first and second flange diaphragms 14, 15 to apply pressure against the opposing flange diaphragm, the first and second compensating capillary tubes 19, 20 offset the pressure effects of temperature fluctuations on each of the high-pressure and low-pressure sides of the temperature compensated differential pressure system.

Figure 3:
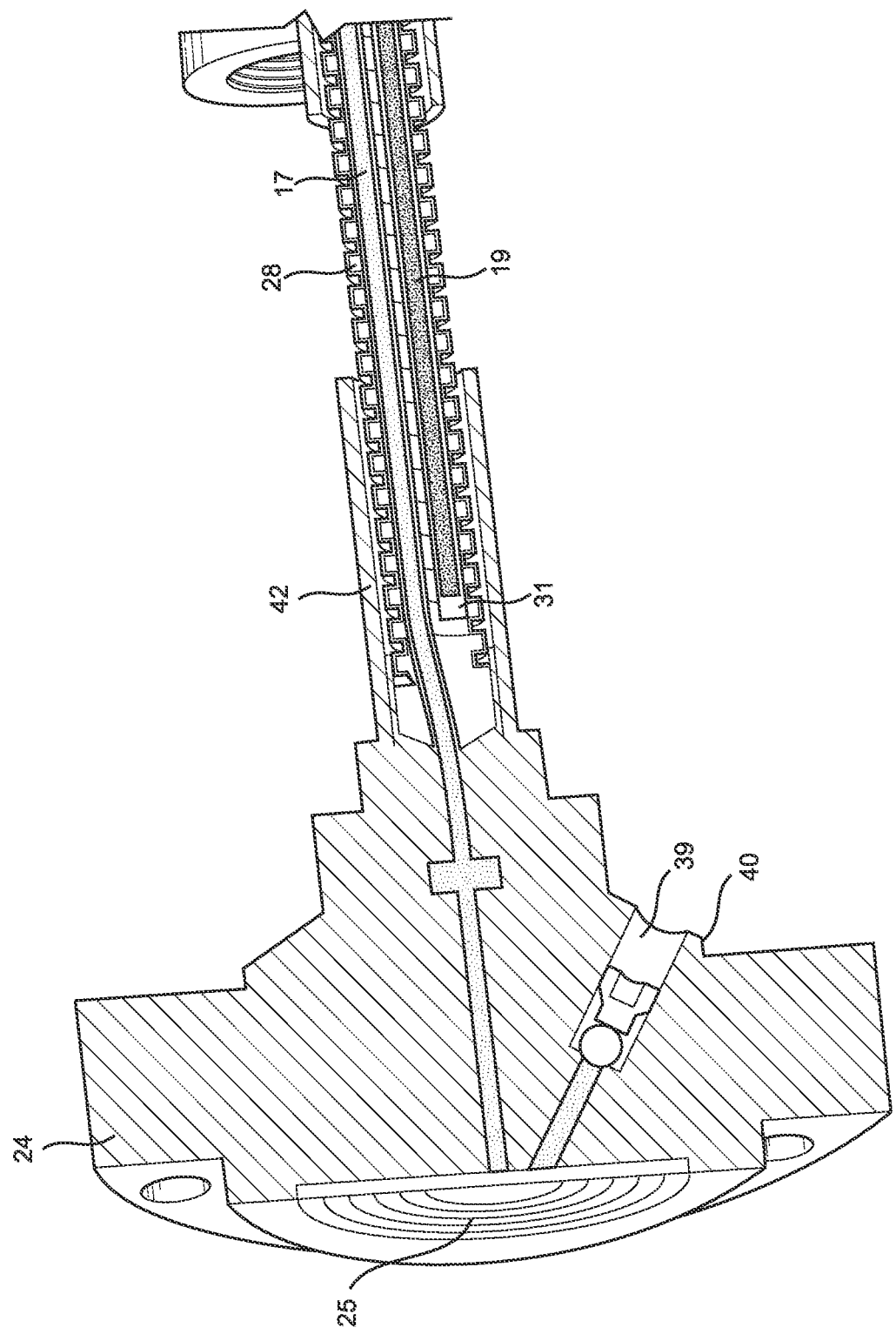
FIG. 3 shows a cross-sectional view of a remote diaphragm housing of an embodiment of the temperature compensated differential pressure system.

Referring now to FIG. 3, there is shown a cross-sectional view of a remote diaphragm housing of an embodiment of the temperature compensated differential pressure system. In the shown embodiment, a single remote diaphragm housing, particularly the first remote diaphragm housing 24, and its associated elements for brevity, however, it should be understood that the second remote diaphragm housing comprises an identical and mirrored configuration. In the shown embodiment, the first remote diaphragm housing 24 includes a first remote diaphragm 25 therein, wherein the first remote diaphragm 25 is configured to be displaced upon an application of pressure from an outlying media exterior to the first remote diaphragm housing 24. The first pressure capillary tube 17 is in operable communication with the first remote diaphragm 25, such that displacement of the first remote diaphragm 25 affects the fill fluid within the first pressure capillary tube 17, thereby allowing the first pressure capillary tube 17 to transmit the displacement pressure of the first remote diaphragm 25. In the illustrated embodiment, the external pressure is applied via a media inlet 39 disposed on a front side 40 of the first remote diaphragm housing 24. The media inlet 39 is configured to allow the external media, such as a fluid within a vessel or surrounding atmosphere, to displace the first remote diaphragm 25. Upon displacement of the first remote diaphragm 25, the pressure of the fill fluid within the first pressure capillary tube 17 transmits the detected pressure to the first flange diaphragm. In this way, the user can sample the pressure at a remote location via placement of the first remote diaphragm housing 24 in the remote location.

The first capillary housing 28 extends from the first remote diaphragm housing 24 about each of the first pressure capillary tube 17 and the first compensating capillary tube 19. In the illustrated embodiment, the remote shroud 42 extends over a portion of the first capillary housing 28 providing an additional layer of protection to the plurality of capillaries in addition to that provided by the first capillary housing 28. As the remote shroud 42 extends over the portion of the first capillary housing 28 directly connected to the first remote diaphragm housing 24, the remote shroud 42 adds further protection to the weakest point of the first capillary housing 28. In the shown embodiment, the first capillary housing 28 comprises an articulated material having a plurality of recesses therein, allowing the first capillary housing 28 to flex about the recesses. In this manner, the user can position the plurality of capillaries in a plurality of configurations to ensure the temperature compensated differential pressure system is capable of use in a variety of process configurations, such as angled or curved positions as required by geometries present at the desired location. In some embodiments, the first capillary housing 28 comprises a durable metallic material to increase the protection provided to the capillaries disposed within the first capillary housing 28. In the shown embodiment, the first compensating capillary tube 19 comprises a closed remote end 31 adjacent to the first remote diaphragm housing 24, such that the first compensating capillary tube 19 is unassociated with the first remote diaphragm 25. In this manner, the first compensating capillary tube 19 does not transmit any displacement pressure from the first remote diaphragm 25, ensuring that the first compensating capillary tube 19 only transmits changes due to temperature fluctuations resulting in expansion or contraction of the fill fluid within the first compensating capillary tube 19.

In the shown embodiment, the first pressure capillary tube 17 and the first compensating capillary tube 19 are maintained in a parallel relationship relative to each other within the first capillary housing 28. This parallel relationship results in each capillary following a similar path, thereby minimizing minor differences in pressure caused by resistance due to curves or angles defined within each capillary tube 17, 19. In this manner, the system negates fluctuations in pressure caused by capillary geometry to ensure that the first compensating capillary tube 19 corrects solely for pressure fluctuations due to temperature differences between each side of the system.

Figure 4:
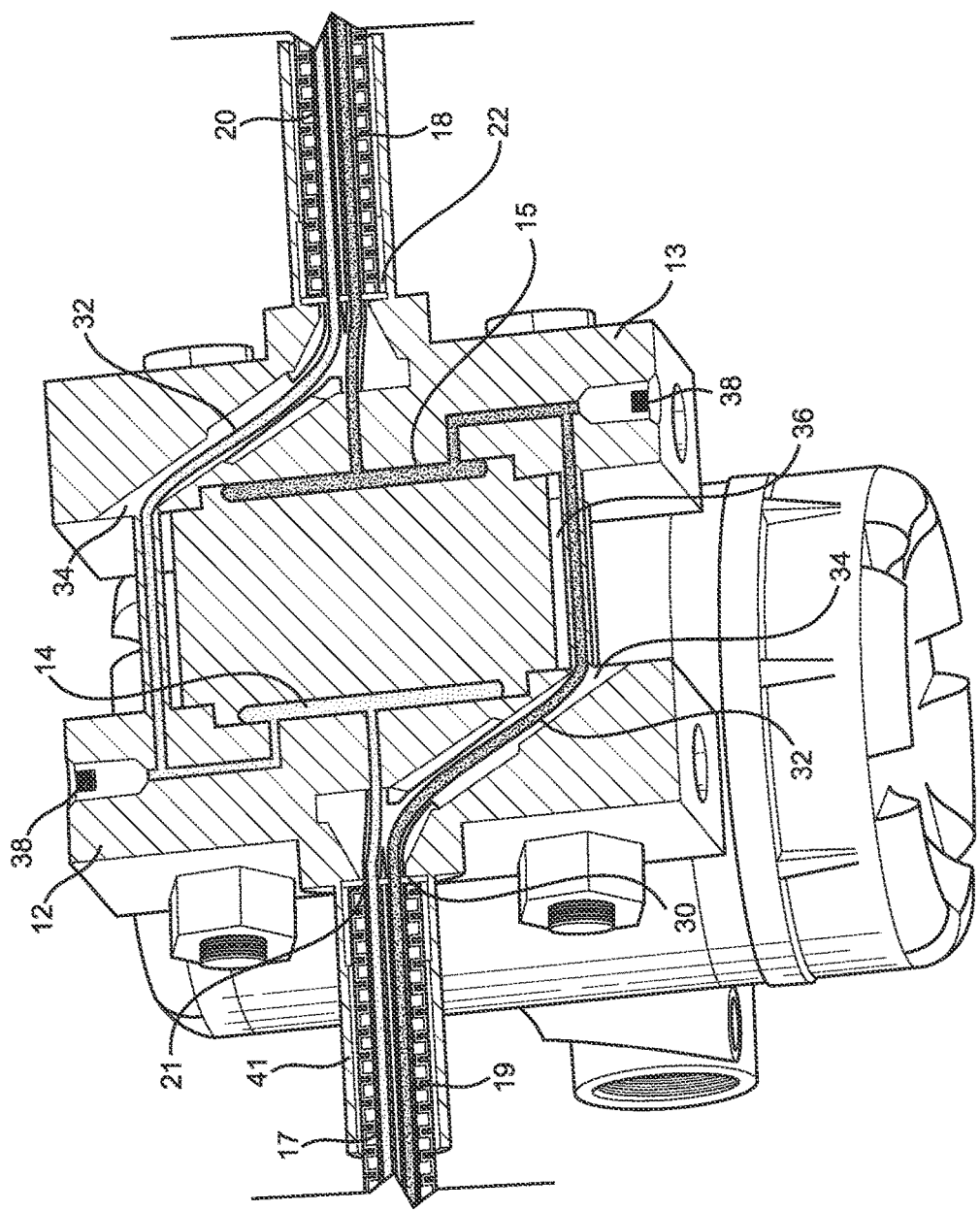
FIG. 4 shows a cross-sectional view of the flanges of an embodiment of the temperature compensated differential pressure system.

Referring now to FIG. 4, there is shown a cross-sectional view of the flanges of an embodiment of the temperature compensated differential pressure system. The first flange 12 is affixed to the second flange 13 via the plurality of fasteners 36 extending through opposing lateral sides of the first and second flanges 12, 13, such that a gap is formed therebetween. The gap is dimensioned to receive the differential pressure measurement device therein, such that the differential pressure measurement device is in operable communication with each of the first and second flange diaphragms 14, 15. The first flange inlet 21 is dimensioned to receive each of the first pressure capillary tube 17 and the first compensating capillary tube 19 therethrough. Similarly, the second flange inlet 22 is dimensioned to receive each of the second pressure capillary tube 18 and the second compensating, capillary tube 20 therethrough. In some embodiments, each of the first flange inlet 21 and the second flange inlet 22 comprise a plate having a pair of openings 30 therethrough, wherein each of the pair of openings 30 receives one of the plurality of capillaries therethrough. In this manner, the plurality of capillaries is maintained in a parallel configuration. In some such embodiments, the plurality of capillaries is welded in place within the pair of openings 30, further securing the plurality of capillaries in position. In the shown embodiment, the flange shrouds 41 extend from a perimeter of the first and second flange inlets 21, 22 to extend over a portion of the first and second capillary housings to further protect and secure the plurality of capillaries to the flange.

The first compensating capillary tube 19 bypasses the first flange diaphragm 14 and extends through the gap between the first and second flanges 12, 13 to operably connect to the second flange diaphragm 15. Similarly, the second compensating capillary tube 20 bypasses the second flange diaphragm and extends through the gap between the first and second flanges 12, 13 to operably connect to the first flange diaphragm 14. In the shown embodiment, a forward portion 32 of each compensating capillary tube is angled to bypass the first and second flange diaphragms 14, 15 through a channel 34 defined through each of the first and second flanges 12, 13. The channel 34 anchors the forward portion 32 within the first and second flanges 12, 13 to stabilize and protect the first and second compensating capillary tubes 19, 20. In the illustrated embodiment, the portion of each of the first and second compensating capillary tubes 19, 20 extending through the gap between the first and second flanges 12, 13 extends parallel and adjacent to one of the plurality of fasteners 36. In this manner, the exposed portion of the compensating capillary tubes is provided additional protection from external sources of damage. In some such embodiments, the exposed portion of the compensating capillary tubes is disposed between two fasteners of the plurality of fasteners 36 for maximal protection. As the first and second compensating capillary tubes 19, 20 are in operable communication with the opposing flange diaphragm and separate from the first and second remote diaphragms, the first and second compensating capillary tubes 19, 20 serve to offset the temperature fluctuations present within the first and second pressure capillary tubes 17, 18. In the shown embodiment, a fill port 38 is disposed in each of the first and second flanges 12, 13, wherein the fill port 38 is in fluid communication with an interior of at least one of the plurality of capillaries. In this manner, the fill port 38 allows the user to add or remove fill fluid from the plurality of capillaries as necessary to maintain proper operation of the temperature compensated differential pressure system.

In one use, the first remote diaphragm housing is placed at a high-pressure side of a process and the second remote diaphragm housing is placed at a low-pressure side of the process, such that the local pressure at each location can be sampled by the first and second remote diaphragms, respectively. As the remote diaphragms are displaced by the ambient pressure of the surrounding media, the displacement pressure is transferred into the fill fluid within the first and second pressure capillary tubes 17, 18 to similarly displace the first and second flange diaphragms 14, 15. The first and second compensating capillary tubes 19, 20 are unassociated with either of the remote diaphragms, such that the only fluctuations in fill fluid pressure therein is due to changes in ambient temperature at each of the high-pressure and low-pressure sides of the process. The first and second compensating capillary tubes 19, 20 are operably connected to opposing flange diaphragms 14, 15, such that the pressures applied to the first and second flange diaphragms 14, 15 offset the pressures applied by the first and second pressure capillary tubes 17, 18. As each pair of capillary tubes on each side of the system is exposed to the same ambient temperature, the expansion or contraction of the fill fluid of each of the pair of capillaries is identical. Therefore, the compensating capillary tubes 19, 20 negate the temperature fluctuations of the first and second pressure compensating tubes 17, 18 to ensure an accurate differential pressure is measured between the high-pressure and low-pressure sides of the system.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A temperature compensated differential pressure system, comprising:
  a first flange affixed to a second flange, wherein the first flange comprises a first flange diaphragm therein and the second flange comprises a second flange diaphragm therein;
  a plurality of capillary tubes comprising a first pressure capillary tube, a second pressure capillary tube, a first compensating capillary tube, and a second compensating capillary tube;
  wherein the first pressure capillary tube extends through a first flange inlet and is in operable communication with the first flange diaphragm;

wherein the first compensating capillary tube extends through the first flange inlet and is in operable communication with the second flange diaphragm;

wherein the second pressure capillary tube extends through a second flange inlet and is in operable communication with the second flange diaphragm;

wherein the second compensating capillary tube extends through the second flange inlet and is in operable communication with the first flange diaphragm;

wherein each of the plurality of capillary tubes comprises a fill fluid therein;

a first remote diaphragm housing having a first remote diaphragm therein, wherein an opposing end of the first pressure capillary tube is in operable communication with the first remote diaphragm;

a second remote diaphragm housing having a second remote diaphragm therein, wherein an opposing end of the second pressure capillary tube is in operable communication with the second remote diaphragm;

wherein a displacement pressure at each of the first and second remote diaphragms is transmitted to the first and second flange diaphragms via the first and second pressure capillary tubes, respectively.

2. The system of claim 1, further comprising a first capillary housing disposed about the first pressure capillary tube and the first compensating capillary tube and a second capillary housing disposed about the second pressure capillary tube and the second compensating capillary tube.

3. The system of claim 2, wherein a vacuum is maintained within each of the first capillary housing and the second capillary housing.

4. The system of claim 2, wherein each of the first capillary housing and the second capillary housing comprise an articulated metal enclosure.

5. The system of claim 2, wherein the first flange inlet and the second flange inlet each include a flange shroud extending over a portion of the first capillary housing and the second capillary housing, respectively.

6. The system of claim 2, wherein the first remote diaphragm housing and the second remote diaphragm housing comprise a remote shroud extending over a portion of the first capillary housing and the second capillary housing, respectively.

7. The system of claim 1, wherein the first pressure capillary tube is maintained parallel to the first compensating capillary tube between the first remote diaphragm housing and the first flange, and the second pressure capillary tube is maintained parallel to the second compensating capillary tube between the second remote diaphragm housing and the second flange.

8. The system of claim 1, wherein each of the first flange inlet and the second flange inlet comprise a pair of openings, wherein each opening of the pair of openings receives one of the plurality of capillary tubes therethrough.

9. The system of claim 1, wherein the first compensating capillary tube is equal in volume to the second compensating capillary tube.

10. The system of claim 1, wherein a remote end of each of the first compensating capillary tube and the second compensating capillary tube is closed.

11. The system of claim 1, wherein a forward portion of each of the first compensating capillary tube and the second compensating capillary tube is angled to bypass the first flange diaphragm and the second flange diaphragm, respectively.

12. The system of claim 11, wherein the first compensating capillary tube and the second compensating capillary tube extend through a gap defined between each of the first flange and the second flange to enter an opposing flange.

13. The system of claim 11, wherein the forward portion of each compensating capillary tube traverses through a channel defined through each of the first flange and the second flange.

14. The system of claim 1, wherein a gap is defined between the first flange and the second flange, the gap dimensioned to removably receive a differential pressure measurement device therebetween.

15. The system of claim 1, wherein the first flange is secured to the second flange via a plurality of fasteners, wherein the plurality of fasteners is disposed on opposing lateral sides of each of the first flange and the second flange.

16. The system of claim 15, wherein the first compensating capillary tube and the second compensating capillary tube extending between the first flange and the second flange are disposed parallel and adjacent to at least one of the plurality of fasteners.

17. The system of claim 1, further comprising at least one fill port within each of the first flange and the second flange, wherein the fill port is in fluid communication with an interior volume of one of the plurality of capillary tubes.

18. The system of claim 1, wherein each of the first remote diaphragm housing and the second remote diaphragm housing comprises a media inlet n operable communication with the first remote diaphragm and the second remote diaphragm, respectively.

19. The system of claim 18, wherein the media inlet extends from a front side of each of the first remote diaphragm housing and the second remote diaphragm housing to the first remote diaphragm and the second remote diaphragm, respectively.

20. The system of claim 1, wherein each of the plurality of capillary tubes is welded in place within the first flange inlet and the second flange inlet.

* * * * *